(12) United States Patent
Elkington et al.

(10) Patent No.: US 10,877,913 B2
(45) Date of Patent: *Dec. 29, 2020

(54) QUEUE DEPTH MANAGEMENT FOR HOST SYSTEMS ACCESSING A PERIPHERAL COMPONENT INTERCONNECT EXPRESS (PCIE) DEVICE VIA A PCIE SWITCH

(71) Applicant: Western Digital Technologies, Inc., San Jose, CA (US)

(72) Inventors: Susan Elkington, Colorado Springs, CO (US); Randy Roberson, Lutz, FL (US); Randall Hess, Colorado Springs, CO (US); Michael Stillwell, Colorado Springs, CO (US); Michael Walker, Colorado Springs, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,667

(22) Filed: Jan. 13, 2020

(65) Prior Publication Data

US 2020/0151130 A1    May 14, 2020

Related U.S. Application Data

(63) Continuation of application No. 15/635,687, filed on Jun. 28, 2017, now Pat. No. 10,579,567.

(51) Int. Cl.
*G06F 13/40* (2006.01)
*G06F 13/42* (2006.01)
(Continued)

(52) U.S. Cl.
CPC ...... *G06F 13/4022* (2013.01); *G06F 12/0246* (2013.01); *G06F 13/161* (2013.01);
(Continued)

(58) Field of Classification Search
CPC ............ G06F 13/4022; G06F 13/4282; G06F 13/161; G06F 12/0246; G06F 2213/0026; G06F 2213/0032; G06F 2212/7201
See application file for complete search history.

(56) References Cited

U.S. PATENT DOCUMENTS 8,806,098 B1    8/2014    Mandapuram et al.
9,335,936 B2    5/2016    Busick et al.
(Continued)

FOREIGN PATENT DOCUMENTS

EP    2998830 A1    3/2016

*Primary Examiner* — Henry Tsai
*Assistant Examiner* — Christopher A Daley

(57) ABSTRACT

Enhancements for managing quality of service in a multi-host Peripheral Component Interconnect Express (PCIe) switching environment involve a host system configured to maintain quality of service statistics corresponding to data interactions with a PCIe storage device available via a PCIe switch. The host system may further receive secondary quality of service statistics for one or more other host systems communicatively coupled to the PCIe device via the PCIe switch, and determine a maximum queue depth for the host system based on the quality of service statistics and the second quality of service statistics to maintain a quality of service for at least the host system.

20 Claims, 6 Drawing Sheets

(51) Int. Cl.
    *G06F 13/16* (2006.01)
    *G06F 12/02* (2006.01)
(52) U.S. Cl.
    CPC .. *G06F 13/4282* (2013.01); *G06F 2212/7201* (2013.01); *G06F 2213/0026* (2013.01); *G06F 2213/0032* (2013.01)

(56) References Cited

U.S. PATENT DOCUMENTS

| | | |
|---|---|---|
| 9,760,392 B1 | 9/2017 | Dantkale et al. |
| 2009/0259749 A1 | 10/2009 | Barrett et al. |
| 2010/0011129 A1 | 1/2010 | Bita |
| 2013/0297907 A1 | 11/2013 | Ki et al. |
| 2016/0034415 A1 | 2/2016 | Singh et al. |
| 2016/0062669 A1 | 3/2016 | Chu et al. |
| 2016/0321012 A1 | 11/2016 | Clark et al. |
| 2016/0378545 A1 | 12/2016 | Ho |
| 2017/0017585 A1 | 1/2017 | Iyer et al. |
| 2017/0171106 A1 | 6/2017 | Woo et al. |
| 2018/0173462 A1 | 6/2018 | Choi et al. |
| 2018/0275923 A1 | 9/2018 | Earhart et al. |
| 2019/0004988 A1* | 1/2019 | Elkington ........... G06F 13/4282 |

\* cited by examiner

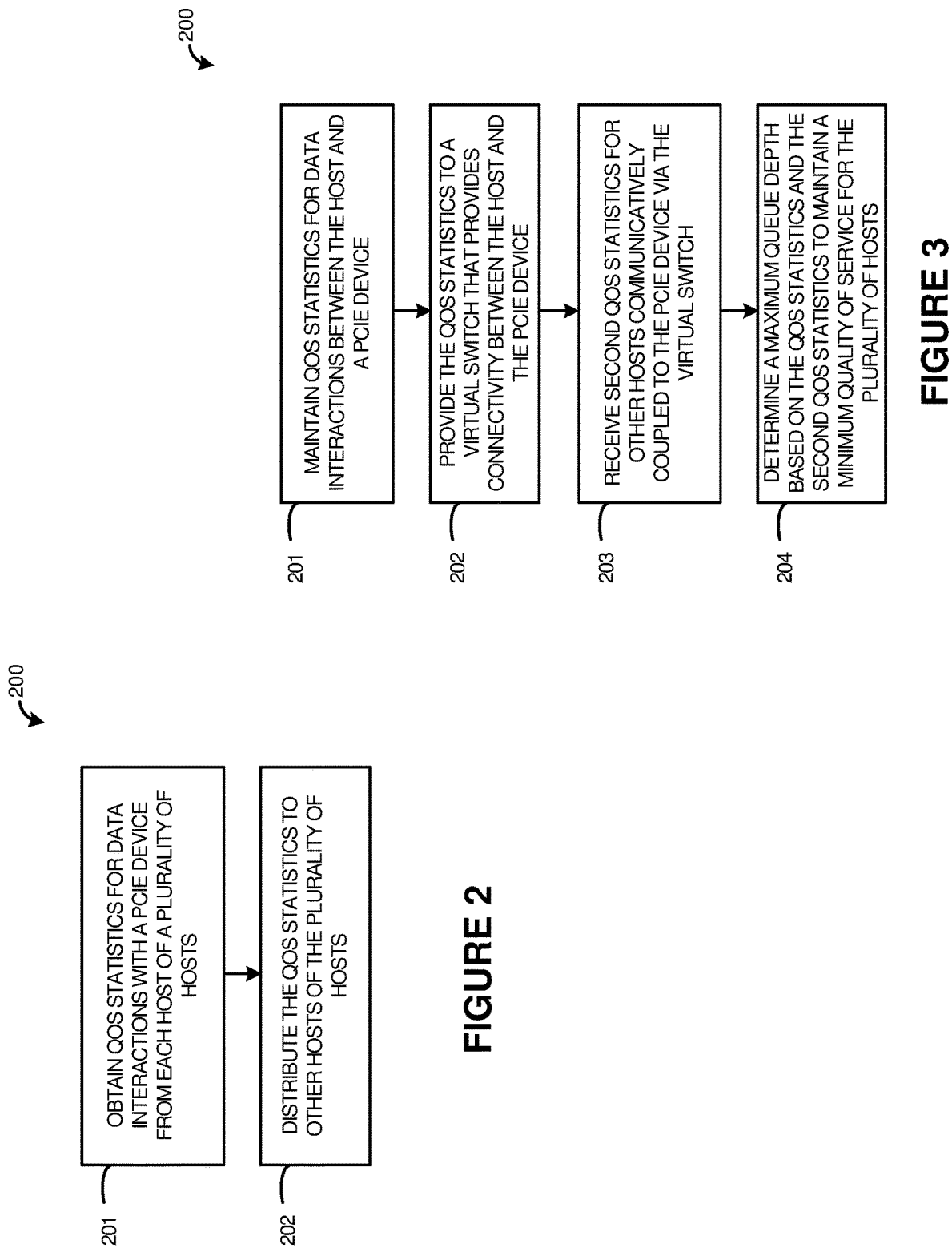

QUEUE DEPTH MANAGEMENT FOR HOST SYSTEMS ACCESSING A PERIPHERAL COMPONENT INTERCONNECT EXPRESS (PCIE) DEVICE VIA A PCIE SWITCH

CROSS-REFERENCE TO RELATED APPLICATIONS

This application is a continuation of and claims the benefit of priority to commonly-owned U.S. patent application Ser. No. 15/635,687 filed on Jun. 28, 2017, now U.S. Pat. No. 10,579,567, the entire content of which is incorporated by reference for all purposes as if fully set forth herein.

BACKGROUND

Peripheral Component Interconnect Express (PCIe) is a high-speed serial computer expansion bus standard that is used to communicate between a host processing system and an expansion device. These expansion devices may comprise networking devices, storage devices, graphics processing devices, among other possible devices. To provide the communications, packets are transferred to and from the host processing system to provide the desired functionality. For example, when data is requested from a PCIe storage device, one or more packets are transferred to the host computing system over the PCIe lanes to the host processing system.

In some implementations, multiple host processing systems may be coupled to a single PCIe device using a PCIe switch or fabric controller. In this configuration, each of the host systems may require data reads and data writes with the PCIe device, which can limit the data throughput that is provided to each of the systems. Consequently, if one host system is using a larger amount of resources than other host systems coupled to the PCIe device, the other host systems may not receive an adequate quality of service.

Overview

Examples disclosed herein provide enhancements for managing quality of service for data interactions between host systems and a Peripheral Component Interconnect Express (PCIe) device. In one implementation, a computing system includes a plurality of host systems coupled to a PCIe device via a PCIe switch, wherein each of the plurality of host systems are configured to maintain quality of service statistics for data interactions between the host system and the PCIe device. Each host system is further configured to provide the quality of service statistics to the PCIe switch for forwarding to the other host systems, and receive second quality of service statistics from the other host systems. Once the second quality of service statistics are received, each of the host systems is further configured to determine a maximum queue depth for data interactions with the PCIe device based on the locally maintained quality of service statistics and the second received quality of service statistics to maintain at least a minimum quality of service for the plurality of host systems.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only to the claims and their equivalents.

FIG. 2 illustrates an operation of a PCIe switch to manage quality of service statistics for multiple host systems according to an implementation.

FIG. 3 illustrates an operation of a host system to exchange quality of service statistics with other host systems coupled to a PCIe switch according to an implementation.

DETAILED DESCRIPTION

Figure 1:
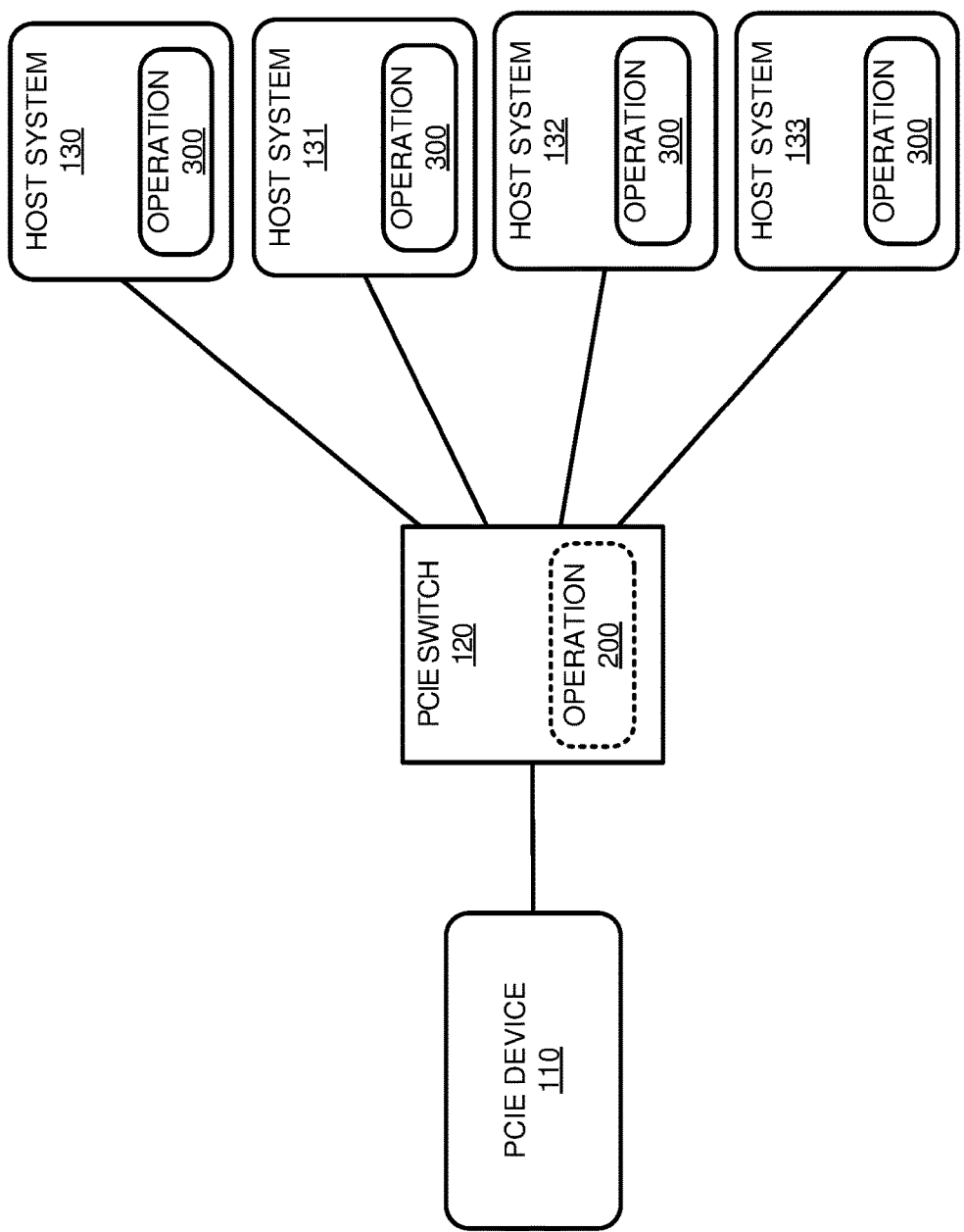
FIG. 1 illustrates a computing system to manage quality of service between host systems and a Peripheral Component Interconnect Express (PCIe) device according to an implementation.

FIG. 1 illustrates a computing system 100 to manage quality of service between host systems and a Peripheral Component Interconnect Express (PCIe) device according to an implementation. Computing system 100 includes PCIe device 110, PCIe switch 120, and host systems 130-133. PCIe device 110 may be representative of a data storage device, such as a Non-Volatile Memory express (NVMe) device, a graphical processing unit, a network interface card (NIC), or some other similar PCIe device. In some implementations, PCIe device 110 may represent a partition or slice of a larger storage device. Host systems 130-133 include at least processing systems and storage systems to provide operation 300 further described in FIG. 3. PCIe switch 120 includes processing circuitry and storage to provide operation 200 further described in FIG. 2. Although described in the examples that follow using PCIe, it should be understood that other similar bus interfaces may use similar operations.

In operation, host systems 130-133 are communicatively coupled to PCIe device 110 via PCIe lanes and PCIe switch 120. Once coupled, and PCIe device 110 is enumerated for each of the hosts, the hosts may transfer and receive data from the PCIe device. For example, when PCIe device 110 comprises a data storage device, each host system of host systems 130-133 may request and receive data from the data storage device, wherein PCIe switch 120 may be responsible for identifying and directing the data to the appropriate host of host systems 130-133.

Here, in addition to each host system being able to access PCIe device 110, each host system may be allocated with a minimum quality of service. This quality of service may be defined by an administrator of the computing system, and may define maximum input/output latency, an expected input/output block request size, or some other similar parameter regarding data interactions with PCIe device 110. Once the minimum quality of service is defined for a host system, the host system will define a first maximum queue depth for data interactions with PCIe device 110, wherein queue depth is the number of input/output commands that can be queued at one time on a storage controller to a storage device. For example, host system 130 may have a first maximum queue depth associated with a minimum quality of service assigned to host system 130, while host system 131 may have a second maximum queue depth associated with a minimum quality of service allocated to host system 131.

Once the maximum queue depths are assigned to the host systems, the host systems may transfer and receive data from PCIe device 110. During these data communications, host system 130-133 will maintain quality of service statistics based on the data communications. These quality of service statistics may include latency for data interactions with PCIe device 110 (average latency, maximum latency, etc.), input/output operations per second (TOPS), amount of bytes being communicated, the maximum latency, and the other similar quality of service statistics, including combinations thereof. As the statistics are determined locally at each of the systems, the systems may exchange quality of service information using PCIe switch 120. In particular, PCIe switch 120 may retrieve the statistics from each of the host systems and distribute the statistics to other host systems of the computing system. Once distributed the host systems may process the statistics to update the maximum queue depth and ensure that each of the host systems is receiving a minimum quality of service.

Although described herein as using the PCIe switch to obtain and distribute quality of service statistics, it should be understood a memory subsystem or some other computing device that is separate from the PCIe switch may communicate with the various hosts to distribute the required statistics. Thus, rather requiring processing resources of the PCIe switch, a separate computing device (or one of the host systems in some examples) may be responsible for distributing the required statistics between the various hosts.

FIG. 2 illustrates an operation 200 of a PCIe switch to manage quality of service statistics for multiple host systems according to an implementation. The processes of operation 200 are referenced parenthetically in the paragraphs that follow with reference to computing system 100 of FIG. 1.

As depicted, operation 200 includes obtaining (201) quality of service (QoS) statistics for data interactions with a PCIe device from each host of a plurality of hosts. As described above with respect to FIG. 1, as host systems 130-133 interact with PCIe device 110, the host systems are configured to maintain quality of service statistics based on the data interactions with PCIe device 110. In some implementations, the host systems may provide the quality of service information to PCIe switch 120 at intervals, such as periodic intervals, when quality of service statistics reach threshold values, or at any other interval. In other implementations, PCIe switch 120 may be configured to request and receive the quality of service statistics from each of the host systems. In at least one example, each host system of host systems 130-133 may provide a storage addressing space to the PCIe switch, wherein the addressing space is used to store the statistics. In this implementation, PCIe switch 120 may obtain or read the statistics from the addressing space on each of the host systems.

Once the quality of service statistics are obtained, PCIe switch 120 then distributes (202) the quality of service statistics to other hosts in the plurality of hosts. For example, using host system 130, PCIe switch 120 may obtain quality of service statistics for each host of host systems 131-133 and provide the statistics to host system 130. Once provided, host system 130 may use the statistics to update a maximum queue depth for communicating with PCIe device 110 to ensure that each of the host systems is receiving an adequate quality of service. In some implementations, in providing the quality of service statistics to each of the host systems, PCIe switch 120 may identify a storage addressing space on each of the host systems to store or write the quality of service statistics for other host systems. For example, PCIe switch 120 may identify a storage location local to host system 130, such as local memory addresses for host system 130, and write the quality of service statistics from host systems 131-133 to the addresses of host system 130.

FIG. 3 illustrates an operation 300 of a host system to exchange quality of service statistics with other host systems coupled to a PCIe switch according to an implementation. The processes of operation 300 are referenced parenthetically in the paragraphs that follow with reference to systems and elements of computing system 100 of FIG. 1.

In operation 300, each host system of host systems 130-133 maintains (301) quality of service statistics for data interactions between the host system and the PCIe device. In particular, each host system of host systems 130-133 may read and write data to PCIe device 110 using PCIe switch 120. During these read and write interactions, the host may maintain information about the latency of the interactions, the TOPS for the interactions, the amount of data being communicated between PCIe device 110 and the host, or some other similar quality of service statistic, including combinations thereof. As the quality of service statistics are being maintained each host system of host systems 130-133, provides (202) the quality of service statistics to PCIe switch 120 that provides connectivity between the host system and the PCIe device. These statistics may be provided at intervals by the host systems, or may be provided in response to a request from PCIe switch 120. In at least some implementations, each host system of host systems 130-133 allocates a local memory storage to storing the quality of service statistics and provides addressing information for the local memory storage to PCIe switch 120. Once provided, PCIe switch 120 may read the data from the storage location associated with each of the host systems. This local memory storage may comprise dynamic random-access memory (DRAM), solid state memory, or some other similar memory that is associated with a host system. The local memory storage may be coupled to the processing system of the host system via a Small Computer System Interface (SCSI) bus, a Serial Attached SCSI (SAS) bus, Serial ATA (SATA) bus, Fibre Channel, or any other similar bus for managing data for the host system.

In addition to providing the local quality of service statistics to PCIe switch 120, each host system of host systems 130-133 also receives (203) second quality of service statistics for other host systems communicatively coupled to the PCIe device via the PCIe switch. Referring to an example in computing system 100, host system 130 may be configured to receive quality of service statistics that were maintained by host systems 131-133. In some implementations, to receive the statistics, PCIe switch 120 may be configured to write the statistics to a memory location local to host system 130, such as a DRAM location, solid state location, or some other location associated with the host system. Once the data is obtained for the other hosts of computing system 100, operation 300 further directs each host system of host systems 130-133 to determine (304) a maximum queue depth based on the quality of service statistics for the local host system, and the second quality of service statistics for the other host systems to maintain a minimum quality of service for the plurality of hosts coupled to the PCIe device via the PCIe switch.

In at least one implementation, host systems 130-133 may be able to increase or decrease their respective maximum queue depth based on the quality of service that is being provided to each of the host systems. For example, host system 130 may initially be provided with a first maximum queue depth, however, based on the locally identifying quality of service statistics, as well as the statistics measured from the other host systems, host system 130 may update the first queue depth to a second queue depth to ensure that a quality of service is maintained for host systems. Thus, of host system 132 were not receiving an adequate quality of service, host system 130 may decrease the maximum queue depth to ensure that host system 132 were receiving an adequate quality of service.

In some examples, in ensuring the each of the host systems is provided with an adequate quality of service, a host system may be configured with information about the quality of service required by other host systems. For example, host system 130 may also be provided with quality of service requirements for the other host systems 131-133. This information may include a maximum latency required by each of the host systems, data block request size required by each of the host systems, or some other similar quality of service requirements for the other host systems. As a result, when the quality of service statistics are obtained for each of the other host systems, host system 130 may modify its own queue depth to ensure that each of the host systems are receiving their required minimum quality of service.

Figure 4:
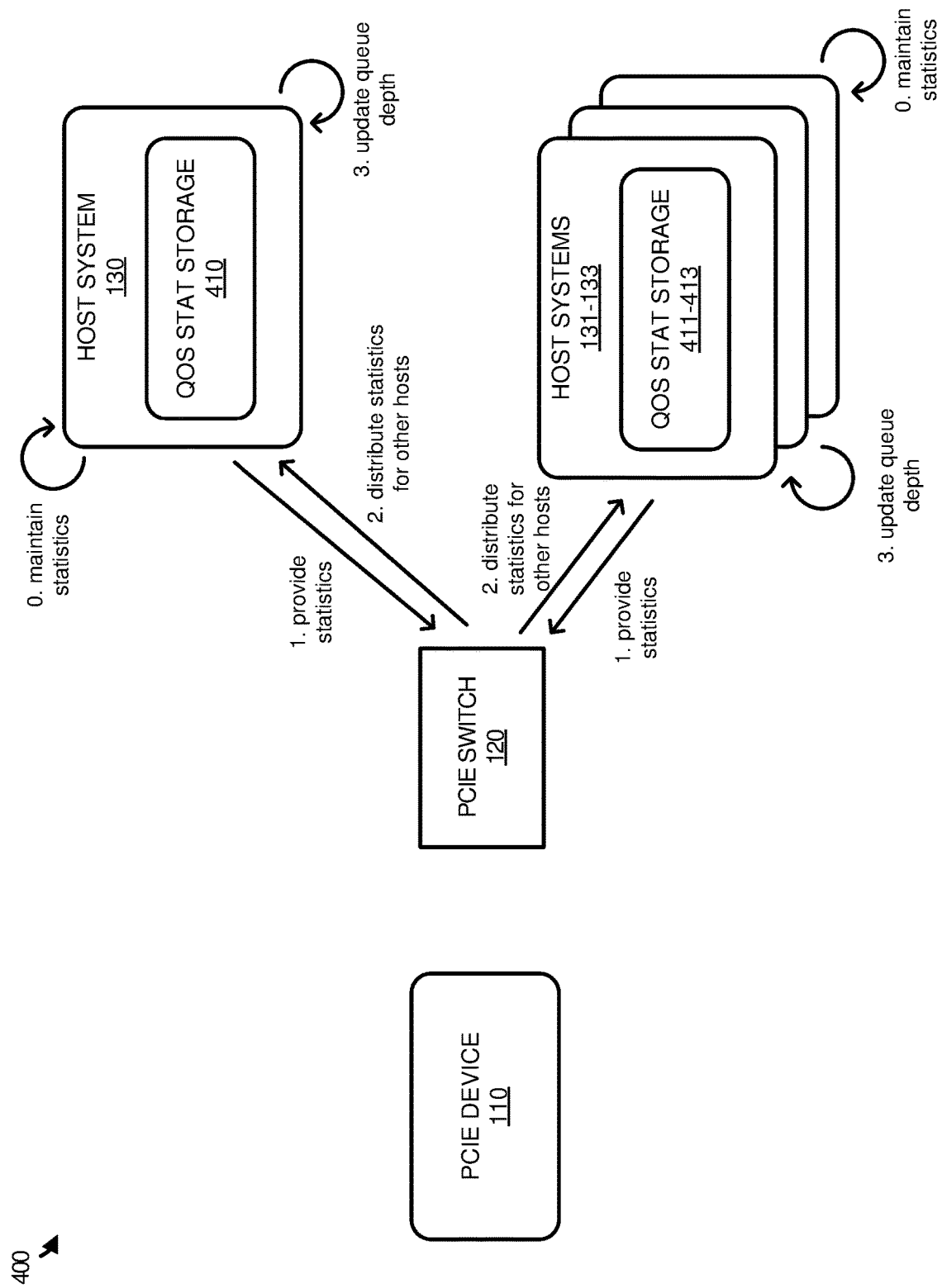
FIG. 4 illustrates an operational scenario of maintaining a maximum queue depth based on the exchange of quality of service statistics according to an implementation.

FIG. 4 illustrates an operational scenario 400 of maintaining a queue depth based on the exchange of quality of service statistics according to an implementation. Operational scenario 400 includes systems and elements of computing system 100 of FIG. 1. Operational scenario 400 further includes quality of service statistics (QOS STAT) storage 410-413 used to store quality of service statistics for each of the corresponding host systems 130-133.

As depicted, at step 0, each host system of host systems 130-133 may maintain quality of service statistics related to data interactions with PCIe device 110, and store the statistics in quality of service statistics storage 410-413. To maintain the statistics, once host systems 130-133 have enumerated PCIe device 110, host systems 130-133 may monitor the data interactions with the PCIe device to identify latency information, the number bytes transferred and received, IOPS information, or any other similar quality of service statistics, including combinations thereof.

As the statistics are maintained, host systems 130-133 provide, at step 1, the statistics to PCIe switch 120. In some implementations, such as that illustrated in operational scenario 400, each of host systems 130-133 may include a corresponding quality of service statistics storage 410-413 to store the identified statistics. PCIe switch 120 may then retrieve the statistics from the corresponding storage locations. In particular, PCIe switch 120 may either be provided with addressing information for the statistics by host systems 130-133, or may be configured with addressing information for statistic storage locations (addresses) by an administrator of computing system 100. Based on the addressing information, PCIe switch 120 may read the desired statistic information from each of the host systems.

Once the information is read from a host system, PCIe switch 120 may distribute, at step 2, the statistics to other host systems of computing system 100. For example, when data is read from host system 130 and quality of service statistics storage 410, PCIe switch 120 may distribute the statistics to host systems 131-133. In some implementations, in distributing the statistics from other host systems, PCIe switch 120 may be configured to write the data to a particular memory portion in each of the host systems, such as a portion of quality of service statistics storage 410-413. For example, with reference to host system 130, host system 130 may provide memory addressing for a portion of quality of service statistics storage 410 to store statistics from other host systems. Once provided, PCIe switch 120 may write to the memory addresses provided with the statistics retrieved from host systems 131-133.

After being provided with the statistics from other the other host systems, each host system of host systems 130-133 updates, at step 3, a maximum queue depth for data interactions with PCIe device 110 based on the locally maintained statistics and the statistics from the other host systems. In some implementations, the maximum queue depth may be updated on each of the host systems to ensure that a minimum quality of service is maintained for each host system. This minimum quality of service for may be assigned by an administrator of the computing system, and may define a minimum latency, an expected input/output block size request, and the like for each of the hosts. From the provided minimum quality of service, a first maximum queue depth may be determined for the host system, which in turn may be updated as described herein.

Figure 5:
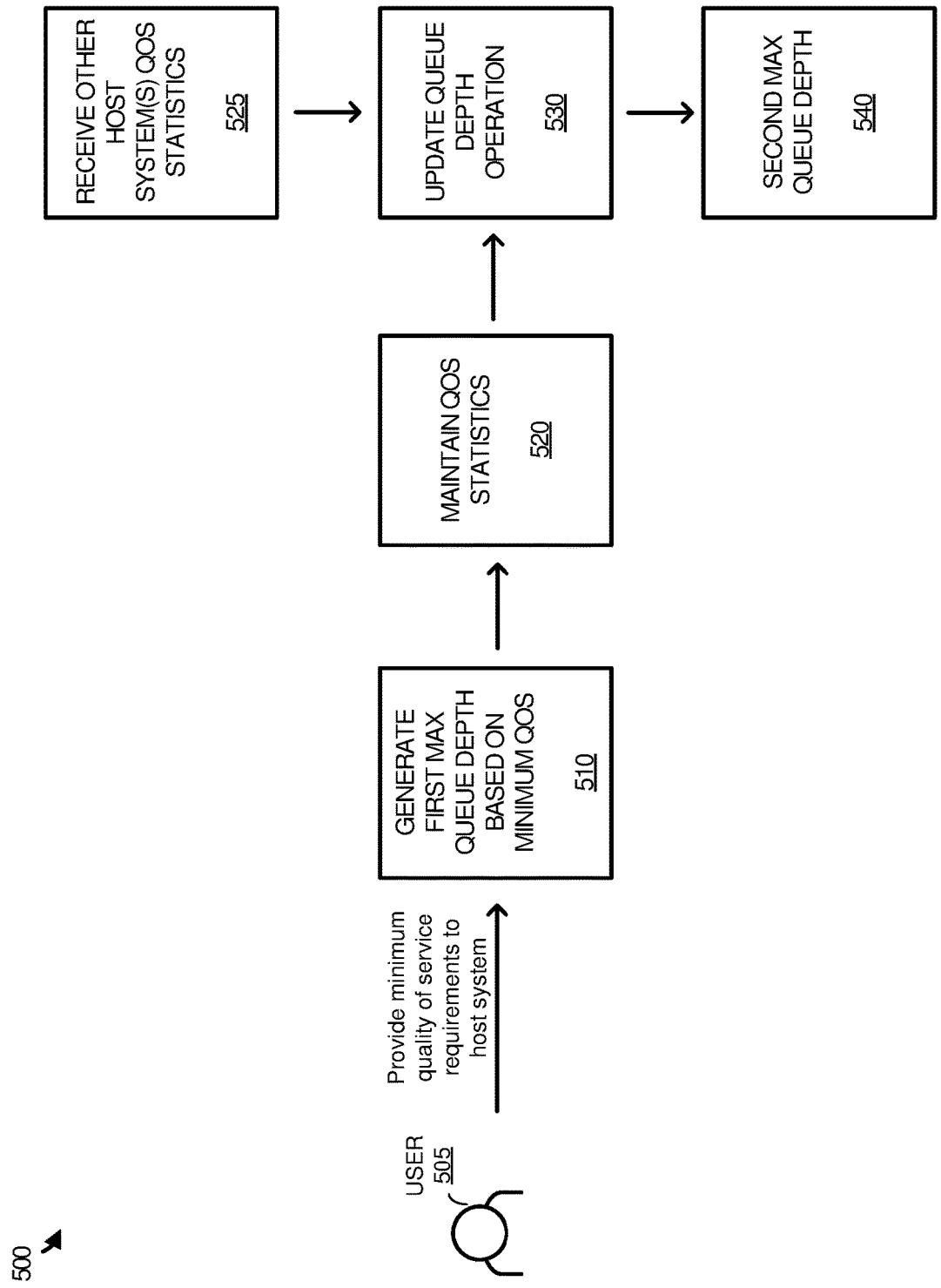
FIG. 5 illustrates an overview of determining a maximum queue depth according to an implementation.

FIG. 5 illustrates an overview 500 of determining a queue depth according to an implementation. Overview 500 includes user 505 with the remaining objects referenced parenthetically in the paragraphs that follow.

As depicted, user 505 provides minimum quality of service requirements to a host system for interacting with a PCIe device coupled to the host system via a PCIe switch, wherein the minimum quality of service may comprise a maximum average latency, a maximum overall latency, an average block size for data communications with the PCIe device, or some other similar quality of service information. Once the information is provided to the host system, the host system may generate (510) a first queue depth based on the minimum quality of service. In particular, the host system may include one or more data structures, such as tables, arrays, and the like capable of applying the quality of service information provided by user 505 to determine a first queue depth for interacting with the PCIe device.

After generating the first queue depth, the host system may provide data interactions with the PCIe device. For example, when the PCIe device comprises a NVMe storage device, the host system may write to and read from storage addresses on the NVMe storage device to provided required operations on the host system. During the data interactions, the host system may maintain (520) quality of service statistics for the data interactions with the PCIe device. In particular, the quality of service statistics may monitor latency, the amount of data transacted, or any other similar quality of service measurement in accessing the PCIe device.

While maintaining the quality of service statistics locally, the host system may receive (525) other host system(s) quality of service statistics, wherein the other host systems communicate with the PCIe device over the same PCIe switch. Based on the statistics received from the other host system(s) and the locally maintained statistics, the host system may provide an update (530) queue depth operation to define a second maximum queue depth 540 for the host system. In some implementations, in determining the new maximum queue depth, the host system may modify the queue depth to ensure that each of the host systems coupled to the PCIe device are provided with at least their minimum quality of service. For example, if the host system determined that a second host system was not receiving an adequate quality of service, the host system may lower the maximum queue depth to assist in providing an adequate quality of service to the second host. In contrast, in some examples, if all host systems are receiving an adequate quality of service, a host may increase the queue depth to use additional resources available in accessing the PCIe device.

Figure 6:
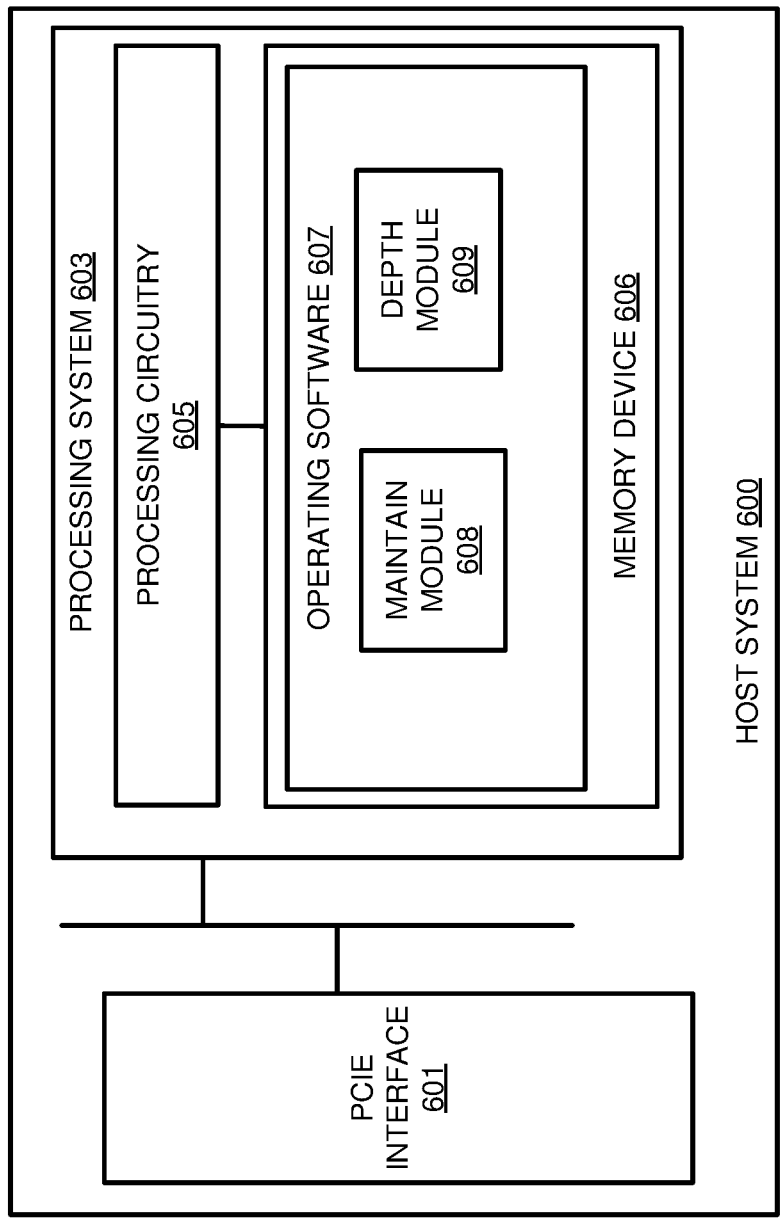
FIG. 6 illustrates a host system according to an implementation.

FIG. 6 illustrates a host system 600 according to an implementation. Host system 600 is representative of any computing system or systems with which the various operational architectures, processes, scenarios, and sequences disclosed herein for host system in FIGS. 1-5 can be implemented. Host system 600 comprises PCIe interface 601 and processing system 603. Processing system 603 is operatively linked to PCIe interface 601. Processing system 603 includes processing circuitry 605 and memory device 606 that stores operating software 607. Host system 600 may include other well-known components such as a battery and enclosure that are not shown for clarity.

PCIe interface 601 comprises components that communicate over PCIe lanes, such as ports, processing circuitry and software, or some other PCIe communication devices. PCIe interface 601 is configured to communicate with at least one PCIe device via PCIe lanes to a PCIe switch, wherein the at least one PCIe device may comprise a PCIe storage device, such as a NVMe device, a graphics processing unit, a NIC, or some other similar PCIe device.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer-readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes maintain module 608, and depth module 609, although any number of software modules may provide similar operations. Operating software 607 may further include an operating system, utilities, drivers, network interfaces, applications, or some other type of software. When executed by processing circuitry 605, operating software 607 directs processing system 603 to operate host system 600 as described herein.

In one implementation, maintain module 608 directs processing system 603 to maintain quality of service statistics for data interactions between host system 600 and a PCIe device made available via a PCIe switch. As the statistics are maintained, maintain module 608 may provide the statistics to the PCIe switch for distribution to one or more other host systems also communicatively coupled to the PCIe device via the PCIe switch. Additionally, maintain module 608 may direct processing system 603 to receive second quality of service statistics related to the data interactions between the one or more other hosts and the PCIe device. Once the second statistics are received, depth module 609 directs processing system 603 to calculate a maximum queue depth based on the local quality of service statistics as well as the statistics received for the other host systems to maintain at least a minimum quality of service for the host system and the other host systems.

In at least one implementation, a user may provide minimum quality of service information to host system 600, wherein the minimum quality of service information is used to determine a first maximum queue depth for data interactions with the PCIe device. Once the initial queue depth is determined, the queue depth may be updated using the operations described herein.

In at least one example, in maintaining the quality of service statistics on host system 600, host system 600 may include an addressing space for the statistics. As a result of this configuration, the PCIe switch may make read requests from the addressing space for the required statistics, and write requests to write to the addressing space to provide the information from the other host systems.

Figure 7:
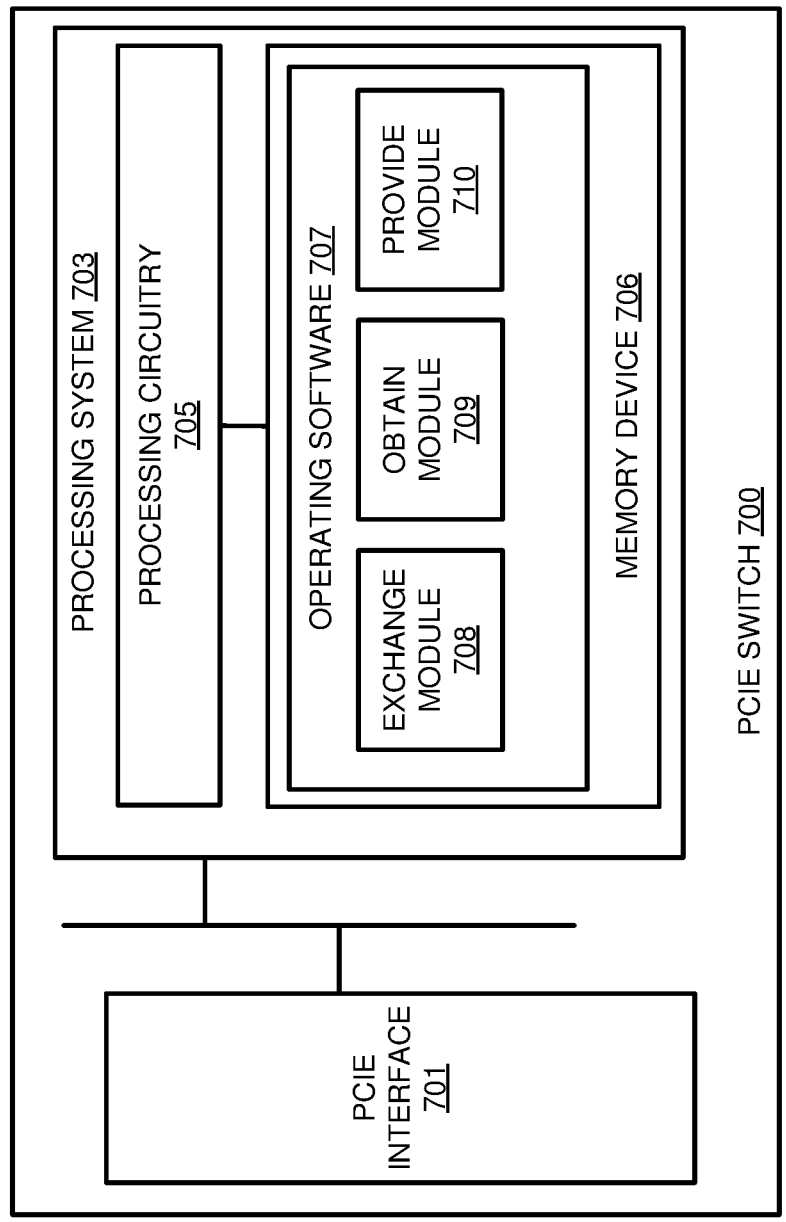
FIG. 7 illustrates a PCIe switch according to an implementation.

FIG. 7 illustrates a PCIe switch 700 according to an implementation. PCIe switch 700 is representative of any computing system or systems with which the various operational architectures, processes, scenarios, and sequences disclosed herein in FIGS. 1-6 for a PCIe switch can be implemented. PCIe switch 700 comprises PCIe interface 701 and processing system 703. Processing system 703 is operatively linked to PCIe interface 701. Processing system 703 includes processing circuitry 705 and memory device 706 that stores operating software 707. PCIe switch 700 may include other well-known components such as a battery and enclosure that are not shown for clarity.

PCIe interface 701 comprises components that communicate over PCIe lanes, such as ports, processing circuitry and software, or some other PCIe communication devices. PCIe interface 701 is configured to couple a plurality of host systems to a PCIe device. These PCIe devices may comprise data storage devices, such as Non-Volatile Memory express (NVMe) devices, graphics processing units, network interface cards, or some other similar PCIe device. In the example of a data storage device, Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer-readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes exchange module 708, obtain module 709, and provide module 710, although any number of software modules may provide similar operations. Operating software 707 may further include an operating system, utilities, drivers, network interfaces, applications, or some other type of software. When executed by processing circuitry 705, operating software 707 directs processing system 703 to operate PCIe switch 700 as described herein.

In at least one implementation, exchange module 708 directs processing system 703 to exchange data between a plurality of host systems and a PCIe device. In particular, exchange module 708 may be used to identify addressing attributes within the communications between the PCIe device and the plurality of hosts and forward the communication based on the addressing. While providing the exchanges with the PCIe device, obtain module 709 directs processing system 703 to obtain quality of service statistics for data interactions between the host systems and the PCIe device. Once obtained, the statistics may then be distributed to the other host systems that are coupled to the PCIe device via the PCIe switch. This exchanging of quality of service information ensures that each of the hosts may modify their queue depth for the PCIe device to ensure that the host systems are all receiving a minimum quality of service for the PCIe device.

In some implementations, to obtain and provide the statistics, each of the host systems may include an addressable storage space for the PCIe switch, wherein the PCIe switch can read from and write to the addressable storage space to obtain and provide the required statistics. In some examples, the host systems may be responsible for providing addressing information to the PCIe switch for the addressable storage space. Once provided, the PCIe switch may write to and read from the appropriate addresses to obtain and provide the required quality of service information.

Although described herein in FIGS. 1-7 as using the PCIe switch to obtain and distribute quality of service statistics, it should be understood a memory subsystem or some other computing device that is separate from the PCIe switch may communicate with the various hosts to distribute the required statistics. This device may be coupled using PCIe, Ethernet, or some other communication interface, and may include a processing system, memory system, or some other computing elements to obtain and distribute the statistics. Using this configuration, rather requiring processing resources of the PCIe switch, a separate computing device (or one of the host systems in some examples) may be responsible for distributing the required statistics between the various hosts.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A host system comprising:
   one or more non-transitory computer-readable storage media;
   a processing system operatively coupled to the one or more non-transitory computer-readable storage media; and
   program instructions stored on the one or more non-transitory computer-readable storage media to manage a maximum queue depth for the host system for data interactions with a Peripheral Component Interconnect Express (PCIe) device available to the host system via a PCIe switch which, when read and executed by the processing system of the host system, direct the processing system to:
   maintain at the host system quality of service statistics for data interactions between the host system and the PCIe device;
   receive at the host system second quality of service statistics for data interactions of one or more other host systems communicatively coupled to the PCIe device via the PCIe switch; and
   determine at the host system the maximum queue depth for the host system based on the quality of service statistics and the second quality of service statistics to maintain at least a minimum quality of service for the host system.

2. The host system of claim 1, wherein the program instructions further direct the processing system to provide the quality of service statistics to the PCIe switch for forwarding to the one or more other host systems.

3. The host system of claim 2, wherein providing the quality of service statistics to the PCIe switch comprises:
   receiving a request for the quality of service statistics from the PCIe switch; and
   in response to the request, providing the quality of service statistics to the PCIe switch.

4. The host system of claim 1, wherein the quality of service statistics comprise one or more of latency information for data requests to the PCIe device, input/output operations per second (IOPS) with the PCIe device, and an amount of bytes communicated over a time period with the PCIe device.

5. The host system of claim 1, wherein the minimum quality of service for the host system comprises a maximum latency and an expected block request size.

6. The host system of claim 1, wherein the minimum quality of service for the host system comprises an administrator-defined minimum quality of service for data interactions with the PCIe device.

7. The host system of claim 1, wherein the program instructions further direct the processing system to:
   after determining the maximum queue depth, receive third quality of service statistics for data interactions of the one or more other host systems with the PCIe device; and
   determine a second maximum queue depth based on the quality of service statistics and the third quality of service statistics to maintain at least the minimum quality of service for the host system.

8. The host system of claim 1, wherein the PCIe device comprises a PCIe storage device.

9. The host system of claim 1, wherein the PCIe device comprises a Non-Volatile Memory express (NVMe) storage device.

10. A system comprising:
a first host system;
one or more secondary host systems; and
a Peripheral Component Interconnect Express (PCIe) switch coupled to the first host system and the one or more secondary host systems, wherein the PCIe switch provides connectivity for the first host system and the one or more secondary host systems to a PCIe device;
wherein the first host system is configured to:
    maintain quality of service statistics for data interactions between the first host system and the PCIe device;
    receive second quality of service statistics from the PCIe switch for data interactions of the one or more secondary host systems with the PCIe device; and
    determine a maximum queue depth for data interactions between the first host system and the PCIe device based on the quality of service statistics and the second quality of service statistics to maintain at least a minimum quality of service for the first host system.

11. The system of claim 10, wherein the PCIe switch is configured to:
    obtain the quality of service statistics from the first host system; and
    distribute the quality of service statistics to the one or more secondary host systems.

12. The system of claim 10, wherein obtaining the quality of service statistics from the first host system comprises reading the quality of service statistics from a memory location of the first host system.

13. The system of claim 10, wherein the quality of service statistics comprise one or more of latency information for data requests to the PCIe device, input/output operations per second (IOPS) with the PCIe device, and an amount of bytes communicated over a time period with the PCIe device.

14. The system of claim 10, wherein the minimum quality of service for the first host system comprises a maximum latency for data interactions with the PCIe device.

15. The system of claim 10, wherein the minimum quality of service for the first host system comprises an administrator-defined minimum quality of service for data interactions with the PCIe device.

16. The system of claim 10, wherein the first host system is further configured to:
    after determining the maximum queue depth, receive third quality of service statistics from the PCIe switch for data interactions of the one or more secondary host systems with the PCIe device; and
    determine a second maximum queue depth for data interactions between the first host system and the PCIe device based on the quality of service statistics and the third quality of service statistics to maintain at least the minimum quality of service for the first host system.

17. The system of claim 10, wherein the PCIe device comprises a PCIe storage device.

18. The system of claim 10, wherein the PCIe device comprises a Non-Volatile Memory express (NVMe) storage device.

19. The system of claim 10, further comprising the PCIe device.

20. A host system comprising:
control means for managing a maximum queue depth for the host system for data interactions with a Peripheral Component Interconnect Express (PCIe) device available to the host system via a PCIe switch, the control means of the host system comprising:
    means for maintaining quality of service statistics for data interactions between the host system and the PCIe device;
    means for receiving second quality of service statistics for data interactions of one or more other host systems communicatively coupled to the PCIe device via the PCIe switch; and
    means for determining the maximum queue depth for the host system based on the quality of service statistics and the second quality of service statistics to maintain at least a minimum quality of service for the host system.

\* \* \* \* \*